United States Patent [19]

Bernhard

[11] Patent Number: 4,490,179

[45] Date of Patent: Dec. 25, 1984

[54] PROCESS FOR RENDERING NACREOUS PIGMENTS HYDROPHOBIC

[75] Inventor: Horst Bernhard, Schwarzenberg, Austria

[73] Assignee: Merck Patent Gesellschaft mit beschrankter Haftung, Darmstadt, Fed. Rep. of Germany

[21] Appl. No.: 478,767

[22] Filed: Mar. 25, 1983

[30] Foreign Application Priority Data

Mar. 26, 1982 [DE] Fed. Rep. of Germany ....... 3211166

[51] Int. Cl.$^3$ .............................................. C09C 3/08
[52] U.S. Cl. .............................. 106/308 F; 106/291; 106/300
[58] Field of Search .......................... 106/291, 308 F

[56] References Cited

U.S. PATENT DOCUMENTS

| | | | |
|---|---|---|---|
| 3,087,828 | 4/1963 | Linton | 106/291 |
| 3,087,829 | 4/1963 | Linton | 106/291 |
| 3,333,980 | 8/1967 | McCord | 106/308 F |
| 3,647,492 | 3/1972 | Chapman et al. | 106/308 F |
| 3,650,790 | 3/1972 | Klenke et al. | 106/291 |
| 3,711,308 | 1/1973 | Brand et al. | 106/291 |
| 4,086,100 | 4/1978 | Esselborn et al. | 106/291 |
| 4,323,554 | 4/1982 | Bernhard | 106/291 |

FOREIGN PATENT DOCUMENTS

| | | | |
|---|---|---|---|
| 52-37930 | 3/1977 | Japan | 106/308 F |
| 55-69629 | 5/1980 | Japan | 106/291 |
| 1279672 | 6/1972 | United Kingdom | 106/300 |

OTHER PUBLICATIONS

Morrison, R. T. et al., Organic Chemistry-second ed., pub. by Allyn and Bacon, Inc., Boston (1966), pp. 578–579.

*Primary Examiner*—Helen M. McCarthy
*Attorney, Agent, or Firm*—Millen & White

[57] ABSTRACT

A process for rendering nacreous pigments hydrophobic, the pigments being based on mica platelets coated with metal oxides, comprises coating the pigments in aqueous suspension with a chromium (III) or aluminum (III) hydroxide or silicate, and then treating the coated pigments with a solution of a hydrocarbon carboxylic acid having more than four carbon atoms per carboxyl group.

18 Claims, No Drawings

PROCESS FOR RENDERING NACREOUS PIGMENTS HYDROPHOBIC

BACKGROUND OF THE INVENTION

The present invention relates to a process for rendering nacreous pigments hydrophobic. The pigments are based on mica platelets coated with metal oxides.

Nacreous pigments based on mica platelets coated with metal oxides are used in many technical fields, such as, for example, in cosmetics, as pigments for nail lacquer, lipsticks, powder and the like, and also for pigmenting all types of plastics and lacquers. So that these nacreous pigments can display their properties in an optimum manner, it is necessary for the pigments to be in homogeneous distribution without agglomerates being formed.

Difficulties in achieving a homogeneous distribution arise again and again, especially when nacreous pigments are incorporated into organic formulations. It is known that improved incorporation of normal colored pigments into, for example, plastics is achieved by rendering the pigments hydrophobic. In the case of nacreous pigments, whose color is produced by interference phenomena in the thin metal oxide coatings, it must be expected that measures for rendering them hydrophobic would substantially influence the nacreous luster.

In fact, even today, no such process has been disclosed by which nacreous pigments can be rendered hydrophobic without deleterious effect on the luster although such pigments have been known for more than 20 years.

SUMMARY OF THE INVENTION

It is thus an object of this invention to provide a process for rendering nacreous pigments hydrophobic.

It is another object of this invention to provide such a process which, on the one hand, modifies the properties of the pigment so that it can easily be incorporated, in homogeneous distribution, into an organic formulation, but, on the other hand, does not have adverse effect on the optical properties of the pigment.

Upon further study of the specification and appended claims, further objects and advantages of this invention will become apparent to those skilled in the art.

These objects have been attained by the finding that, surprisingly, the pigments can first be coated with a basic chromium or aluminum compound and then treated with a longer-chain carboxylic acid.

The invention thus relates to a process for rendering nacreous pigments based on mica platelets coated with metal oxides hydrophobic, comprising coating the pigments, in aqueous suspension, with a basic chromium or aluminum compound and then treating them with a solution of an optionally substituted carboxylic acid containing more than four carbon atoms per carboxyl group.

The invention also relates to the pigments thus obtained, and to their use.

DETAILED DISCUSSION

A good hydrophobic effect which greatly improves the incorporation of the pigments into organic formulations is achieved with the new process of this invention. Contrary to fears, the luster and coloring power of the pigments are not impaired by the additional coating. Surprisingly, the properties of the pigments, in particular their stability to light and weathering, can even be improved by the treatment of this invention to render them hydrophobic.

All the customary nacreous pigments based on mica can be rendered hydrophobic by the treatment according to this invention. Such pigments are described, for example, in German Patent Specification Nos. 1,467,468, 1,959,198, 2,009,566, 2,214,545 and 2,522,572. To carry out the process of this invention, the starting material is suspended in water and a pH value suitable for precipitating a basic chromium or aluminum compound is established in the suspension. As a rule, a pH value of about 4 to about 9, especially a value in the range from about 5 to about 8, is suitable for this purpose.

A solution of a chromium or aluminum salt is allowed to run slowly into this suspension, the pH value being kept substantially constant by appropriate conventional measures, such as, for example, simultaneous metering in of a base or an acid. Suitable bases include, e.g., ammonia, alkali metal hydroxides, etc. Under the prevailing pH conditions, hydrolysis and deposition of chromium hydroxide or aluminum hydroxide occur. If silicates are additionally also to be precipitated, alkali metal silicate solutions are preferably used, and these are metered in at the same time.

The rate at which the salt solutions are metered in is not in itself critical, but is should be ensured that the amount of chromium compound or aluminum compound precipitated per unit time is deposited as far as possible quantitatively on the pigment surface. The feed rate is therefore as a rule adjusted such that about 0.01 to $25 \times 10^{-5}$ mole of the dissolved salt is added per minute and per square meter of surface to be coated.

Although the pigments can be coated at any desired temperatures between the freezing and boiling points of the suspension, coating is nevertheless preferably carried out at elevated temperature in order to achieve as homogeneous as possible a precipitation. Temperatures of about 40° to 90° C., and in particular 50° to 80° C., are therefore preferred.

All chromium or aluminum salts which are readily water-soluble and can be hydrolysed can be used for the coating. Examples include: aluminum chloride, aluminum sulfate, potassium aluminum sulfate, an aluminum hydroxyl-complex, (for example $Al(OH)Cl_2$, $KAl(OH)_6$ or the like), chromium-III chloride, chromium-III sulfate or chrome alum. Chromium-VI salts can also be used, in which case a reducing agent, such as, for example, hydroxylamine or hydrazine, must also be added in order to produce chromium-III ions.

If a silicate-containing precipitate is to be obtained instead of a pure hydroxide precipitate, an alkali metal silicate solution is metered in at the same time as the metal salt solution. The amount of silicate may be chosen such that the silicate is added in the stoichiometric amount for formation of a chromium or aluminum silicate. However, less silicate, for example an amount which corresponds to about 1 to about 50% of the stoichiometric amount, is preferably used.

The additional presence of silicate in the surface coating in many cases helps to produce dense coatings with a good light and weathering stability.

The amount of the chromium or aluminum compound precipitated onto the pigment surface should be chosen at least such that the entire surface is covered with a thin layer. Somewhat thicker layers do not manifest themselves in an adverse manner; however, if the layers are too thick, an increasing amount of gloss and luminosity of the pigments is lost.

The chromium or aluminum compounds are therefore as a rule employed in amounts such that about 0.1 to about 100 μmoles, preferably about 0.5 to about 50 μmoles, is deposited per square meter of pigment surface. This corresponds to a percentage by weight of the coated pigments of about 0.1 to about 10%.

The pigments thus coated are then treated with a solution of a carboxylic acid, e.g., in water. Suitable carboxylic acids include all those with a sufficiently long hydrophobic radical. These are, in particular, optionally substituted monobasic acids with 5 or more carbon atoms, e.g., a hydrocarbon carboxylic acid., e.g., an alkane carboxylic acid. Carboxylic acids with 10 to 20 carbon atoms are preferred. If dibasic or polybasic carboxylic acids are used, at least 4 or 5 carbon atoms should likewise be present per carboxyl group. Thus, it has been found, for example, that butyric acid, succinic acid or adipic acid are not particularly suitable for the purpose of this invention; however, for example, azelaic acid, ricinoleic acid, oleic acid, palmitic acid, capric acid, stearic acid, sebacic acid or lauric acid are very suitable.

It is of course also possible to use substituted carboxylic acids. In this case, it should only be ensured that the effect of the hydrophobic treatment is not eliminated or unacceptably deteriorated by hydrophilic substituents. On the other hand, for certain purposes it may be advantageous to adapt the degree of hydrophobic character to the intended use, for which, inter alia, the use of variously substituted carboxylic acids or carboxylic acids with shorter or longer carbon chains is suitable, as is known. All such conventional substituted acids are contemplated equivalents of the mentioned acids per se.

The carboxylic acids used in accordance with this invention add onto basic locations in the coating previously applied, and are firmly bonded thereto. When the coated pigments are treated with the carboxylic acid, a saturation value therefore results, beyond which no additional acid can be bonded. For this reason, the amounts of carboxylic acid used are not particularly critical, since an excess of acid remains in solution and is removed when the pigments are washed. On the other hand, if desired, less than the stoichiometric amount of acid may be used in order to achieve only partial hydrophobic character. However, the acid is as a rule used in an amount of about 0.01 to about 50 μmoles per square meter of pigment surface.

After the acid has been added, the pigment suspension is stirred further for some time, for example about 10 to 100 minutes, and is then filtered and the pigment is washed and dried. The pigments according to this invention can then be used in the same way as known pigments, for example, in cosmetics and in plastics, lacquers and paints. Compared with the known nacreous pigments, they are distinguished by an improved ease of incorporation, above all into organic formulations.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A suspension of 330 g of a rutile $TiO_2$/mica pigment with a platelet size of 10 to 70 μm in 2 liters of water is heated to 70° C. and adjusted to a pH value of 6.0. A solution of 50 g of $AlCl_3.6H_2O$ in 500 ml of water is first slowly added to the suspension, the pH value being kept constant at about 6 by metering in dilute ammonia solution. A solution of 2 g of oleic acid in 50 ml of water is then added, the mixture is stirred for about a further 30 minutes at 70° C. and the pigment is then filtered off, washed and dried.

EXAMPLE 2

A suspension of 330 g of a rutile $TiO_2$/mica pigment with a platelet size of 10 to 70 μm in 2 liters of water is heated to 70° C. and adjusted to a pH value of about 6.5. A solution of 11 g of chrome alum in 500 ml of water is first slowly added to the suspension, the pH value of the suspension being kept at about 6.5 by metering in dilute ammonia solution. A solution of 5 g of capric acid in 50 ml of water is then added. The mixture is stirred for about a further 30 minutes at 70° C., and finally the pigment is filtered off, washed and dried.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for rendering nacreous pigments hydrophobic, the pigments being based on mica platelets coated with metal oxides, comprising coating the pigments in aqueous suspension with a chromium (III) or aluminum (III) hydroxide wherein up to 50% of the hydroxide ions can be replaced by silicate ions, and then treating the coated pigments with a solution of a hydrocarbon carboxylic acid having more than four carbon atoms per carboxyl group in an amount and at a temperature effective to react with the hydroxide groups of the chromium or aluminum hydroxide layer whereby the hydrocarbon carboxylic acid becomes bonded to the surface of the pigments rendering them hydrophobic.

2. A process of claim 1 comprising coating the pigments with a combination of chromium (III) hydroxide and silicate or aluminum hydroxide and silicate.

3. A process of claim 1 wherein the pigments are coated with about 0.1 to about 10 percent by weight of the chromium or aluminum compound, calculated as the oxide.

4. A process of claim 1 wherein the carboxylic acid is used in an amount of about 0.01 to about 50 μmoles per square meter of pigment surface to be treated.

5. A process of claim 1 comprising suspending the pigment particles in an aqueous medium; adding thereto a water soluble aluminum or chromium (III) salt while maintaining the pH of the medium at 4–9 thereby precipitating the corresponding hydroxide onto the pigment particles.

6. A process of claim 5 wherein an alkali metal silicate is also added to the medium, thereby precipitating an aluminum or chromium (III) silicate onto the pigment particles.

7. A process of claim 5 wherein the water soluble chromium or aluminum salt is added in the form of an aqueous solution at a metering rate of from 0.01 to $25 \times 10^{-5}$ mole of solution per minute per square meter of surface to be coated.

8. A process of claim 1 wherein the pigment particles are coated at a temperature of 50°–80° C.

9. A process of claim 5 wherein the water soluble aluminum or chromium (III) salt is aluminum chloride, aluminum sulfate, potassium aluminum sulfate, an aluminum hydroxyl-complex, chromium-III chloride, chromium-III sulfate or chrome alum.

10. A process of claim 6 wherein the amount of silicate added is about 1–50% of the stoichiometric amount based on the amount of aluminum or chromium (III) added.

11. A process of claim 1 wherein the carboxylic acid is an alkane acid of 10–20 C-atoms.

12. A process of claim 11 wherein the acid is azelaic acid, ricinoleic acid, oleic acid,, palmitic acid, capric acid, stearic acid, sebacic acid or lauric acid.

13. A process of claim 1 further comprising subsequently separating the pigment particles from the treating solution, washing them, and drying them.

14. A hydrophobic nacreous pigment prepared by a process of claim 13.

15. A hydrophobic nacreous pigment consisting essentially of a mica platelet coated with a metal oxide; and, thereon, a coating of a chromium (III) or aluminum oxide having bonded thereto carboxylic acid residues of more than 4 carbon atoms per originally contained carboxyl group, and wherein up to 50% of the oxide ion sites can be replaced by silicate ions.

16. In a pearlescent composition comprising a base ingredient and a nacreous pigment, the improvement wherein the nacreous pigment is that of claim 14.

17. A pearlescent composition of claim 16 which is an organic formulation.

18. In a method of pigmenting an organic formulation by homogeneously distributing pigment therein, the improvement wherein the pigment is that of claim 14.

* * * * *